United States Patent Office 2,791,521
Patented May 7, 1957

2,791,521

ELECTRIC RESISTANCE DEVICE PROVIDED WITH ZINC OXIDE ELECTROCONDUCTIVE COATING

Mary S. Jaffe, Cleveland Heights, Ohio, assignor to General Electric Company, a corporation of New York Application April 2, 1953, Serial No. 346,533

10 Claims. (Cl. 117—211)

This invention relates to electroconductive films and more particularly to electrically conducting coatings on high temperature resisting substrates such as glass and ceramics.

It is well known that thin films may be formed on glass by subjecting it at a high temperature to the action of certain metallic salts. Due to the extreme thinness of such films, they are generally iridescent and the process by which they are formed is known as iridizing. Certain metal salts, those of tin and indium in particular, provide films having substantial electrical conductivity. Electroconductive glass panels comprising such films are finding considerable application as electric resistance devices, for instance as de-iceable windshields for aircraft, as heater elements for bread toasters and room heaters, as the transparent and electrically conductive layer in electroluminescent cells or panels, and as conductive coatings for glass envelopes of lamps and other electric discharge devices.

The object of the present invention is to provide a new kind of electrically conductive coating on glass or other high temperature resisting substrate and having, for certain applications, advantages over presently known coatings.

Another object is to provide an electroconductive coating which can be comparatively easily removed from selected areas in order to provide a nonconductive pattern or figure on an otherwise uniformly conductive field.

A further object of the invention is to provide an electroconductive coating on glass particularly suitable for electroluminescent cells using phosphors incorporating substantial amounts of zinc, for instance zinc sulphide with suitable activators.

The present invention is based upon my discovery that it is possible to form on glass, zinc oxide coatings of substantial conductivity. Although zinc oxide coatings have before now been provided on glass, they have been used solely for their optical properties, for instance in creating decorative effects. In the literature pertaining more particularly to electroconductive coatings on glass, there is mention of zinc as an additive in tin oxide films. However, as far as I am aware, it has never up until the present time been proposed to use zinc oxide as the basic constituent of an electroconductive coating since zinc oxide was generally regarded as having a resistance so high that films thereof were practically useless for electrical resistance purposes.

Although I shall, in the following description, refer to the substrate on which the film is formed as glass, it is not to be limited specifically to glass. In general the substrate may more broadly be considered as any material which can withstand the high temperatures involved in the formation of the film, for example Pyrex and Vycor glasses, ceramics, quartz and quartz-like glasses, oxidation resistant metals, and such high temperature-stable crystals as quartz, corundum, rutile, diamond and silicon carbide, to mention but a few.

I have now discovered that in spite of the inherently high resistance of zinc oxide films, the resistance of such films may be lowered to a point where they become useful and practical electroconductive coatings by combining therewith small amounts of trivalent conductivity activators. The most effective single activator which I have found is indium, and a very effective combination of activators which I have found consists of a mixture of indium and gallium in a molar ratio of 3 to 2, added to zinc in such proportion that the sum of the moles of indium and gallium is 2 to 20 percent of the total moles of Zn+In+Ga.

The following table gives a general idea of the region in the resistance scale occupied by coated glasses as compared with conductors such as copper, and insulators such as plate glass.

TABLE I

*Comparative resistivities*

$P$ = specific resistivity
$R$ = resistance per square at 1300 A. ($700 \times 10^{-8}$ cm.)
$t$ = thickness (cm.)

$$R = \frac{P}{t}$$

| Substance | P ohm—cm. | R ohms per square |
|---|---|---|
| Conductors (copper) | $1.7 \times 10^{-6}$ | 0.13 |
| Insulators (glass) | $2 \times 10^{+13}$ | $1.5 \times 10^{+18}$ |
| Commercial conducting glass ($SnO_2$) | $3.7 \times 10^{-3}$ | 300 |
| ZnO (unactivated) | 28 to 6,500 | (2.1 to 500) $\times 10^{+6}$ |
| ZnO (In) | $11 \times 10^{-2}$ | 9,000 |
| ZnO (In+Ga) | $3.7 \times 10^{-2}$ | 3,000 |

The above table gives, in addition to the specific or volume resistivity, the resistance in ohms per square of a film having a thickness of about 1300 angstrom units. In the case of zinc oxide having a refractive index of approximately 2, such a thickness corresponds to the first order red interference color which I have used as a standard throughout my tests. Since the resistance of a film measured between two parallel lines varies inversely with the length of the lines and directly with the distance between them, it follows that when the lines define a square, the resistance is constant for any one particular film irrespective of the size of the square. For this reason, the electrical resistance of an iridized film can be expressed in ohms per square to provide figures which are more manageable than the specific resistivities.

Referring to the table, it will be observed that iridized films of unactivated zinc oxide have very high resistance. Also, their resistance is extremely variable, ranging from 2.1 to 500 million ohms per square. The variability appears to be due to traces of impurities in the zinc which serve as activators to increase its conductivity. It will readily be appreciated that an iridized film of unactivated zinc oxide is a substantial insulator and that the prior art was entirely justified in considering it as such. Iridized films of zinc oxide activated with indium in accordance with my invention have been made having a resistance of 9000 ohms per square. Similar zinc oxide films activated with indium and gallium have been made having a resistance of 3000 ohms per square. Although such conducting zinc oxide films have a resistance which is higher than that of commercial conducting glass consisting of iridized films of tin oxide, their resistance is low enough to permit them to be classified as electric resistance elements. Furthermore, conducting films of zinc oxide have characteristics which are highly advantageous for certain specific applications as will be explained hereafter.

A suitable method for forming conductive zinc oxide coatings in accordance with the invention is to spray an aqueous or an aqueous-alcoholic solution of appropriate salts of zinc and of the activator onto glass at a temperature from 350° C. up to the softening point of the glass which may be anywhere from 700 to 900° C. In selecting a suitable zinc salt, the requirement must be kept in mind that the salt must hydrolize or decompose to the oxide very rapidly upon striking the glass in order to form a clear film. Salts which are too unstable decompose before reaching the glass and deposit as a dust which is not adherent, or exceedingly low boiling salts may volatilize away, giving no coating at all. On the other hand, salts which are too stable may melt on the glass and take appreciable time to decompose, or may not decompose at all, giving a somewhat more adherent but very "frosty" film, with little or no conductivity.

Of the various zinc salts which I have tested, the acetate gave the best film from the point of view of clearness and high conductivity. Zinc formate produced a film of fair quality but, not being very water soluble, required a dilute spray so that the process was rendered more laborious. Zinc chloride gave a film of high conductivity but rather frosty in appearance; for certain applications, a frosty film is not necessarily a disadvantage as for instance in electroluminescent panels where the only requirements are conductivity and the ability to transmit light. Zinc monochloracetate also produced a film but of a quality inferior to that produced by the acetate. Films produced from zinc nitrate and zinc trichloracetate were in general inferior to films produced from the other salts that have been mentioned.

During the course of my experiments, I discovered that pure zinc oxide (unactivated) films show an appreciable "seasoning" effect. As may be seen from the table of comparative resistivities, the resistance of an unactivated zinc oxide coating may vary from 2.1 to 500 megohms per square. A typical zinc oxide panel will have an initial resistance of 100 megohms, falling to 40 megohms in three hours, to 6 megohms in one day, and to 5 megohms in a week. This seasoning effect is thought to be due to loss of oxygen atoms from the oxide, followed by valence changes and position rearrangements of the zinc atoms. Proceeding on such considerations, I have theorized the following primitive picture of the conductivity mechanism in zinc oxide. Zinc is normally divalent in compounds, but can exist in the monovalent state. A monovalent ion in a lattice such as ZnO will have one more electron than its divalent neighbors. It is assumed that the oxygen atoms remain unchanged at a valency of $-2$ during these processes. Under the influence of an applied electric field gradient, these excess electrons can be considered to "hop" from zinc to zinc atoms, thus furnishing a negative type conductivity. The conductivity is thought to be proportional to the number of these monovalent zinc ions or carriers.

However, only a few such monovalent zinc ions or carriers are formed spontaneously by loss of oxygen atoms so that the natural conductivity of unactivated zinc oxide films is limited. In order to increase the conductivity of the film, more zinc atoms must be induced to be monovalent, and in order to maintain over-all electric neutrality in the lattice, the activating atoms introduced into zinc sites in the lattice must be trivalent. Only a limited number of these trivalent activator atoms can be introduced before other effects such as the limit of solubility of one oxide in the other come into play; hence a rather narrow concentration optimum must be expected for maximum conductivity. In addition, the trivalent ion must be of such size and nature as to fit comfortably into the zinc oxide lattice, and the chemistry of the trivalent ion must permit it to co-exist in solution with the zinc salt used in the spraying process without unwanted side reactions.

The most effective single activator which I have found consists of indium. A film was formed by spraying a solution of zinc acetate to which indium chloride was added, onto soft lime glass at a temperature of 620° C. A number of test panels were formed in which the atomic percentage of indium relative to zinc was varied over the range from 1 to 10 percent. A decided maximum in conductivity was observed at 4% atomic weight of indium relative to zinc, the resistance for this panel being 9,000 ohms per square. When the concentration of indium was lowered to 2% the resistance rose to 130,000 ohms per square and on the other side of the 4% optimum, the resistance rose to approximately the same value at 8% atomic weight of indium relative to zinc. The occurrence of such a rather narrow concentration-conductivity optimum is believed to confirm generally the conductivity picture which I have set forth above.

Gallium alone as the conductivity activator in a zinc oxide film produces erratic results, and the seasoning effect was very marked. This may be attributed to the small size of the gallium ion which readily permits room temperature rearrangements in the lattice. Table II below lists some generally accepted values for the effective radii in angstrom units of certain elements. Those listed include zinc in its ionic state for a valence of $+2$ and other elements worthy of consideration as activators and having a valance of $+3$:

TABLE II

*Effective radii of atoms*

| Element | Charge | Radius, Angstrom |
|---|---|---|
| Zn | $+2$ | 0.83 |
| Al | $+3$ | 0.55 |
| Ga | $+3$ | 0.65 |
| Ni | $+3$ | 0.6 |
| Co | $+3$ | 0.65 |
| Fe | $+3$ | 0.67 |
| Cr | $+3$ | 0.70 |
| Sc | $+3$ | 0.83 |
| In | $+3$ | 0.95 |
| Y | $+3$ | 0.95 |
| Tl | $+3$ | 0.95 |

If the requirement that the trivalent activator ion must be of such size and nature as to fit comfortably into the zinc oxide lattice is kept in mind, the failure of gallium to contribute much conductivity may readily be explained. Referring to Table II, it will be observed that $Zn+2$ has an ionic radius of 0.83 A. whereas $Ga+3$ has an ionic radius of 0.65 A. It is believed that the comparatively small size of the $Ga+3$ ion would make it prefer to co-ordinate with the surrounding oxygen ions to form a gallate ion; the molecule of zinc gallate thus formed would be electrically neutral with zinc still in the divalent state, and hence, nonconductive.

Referring again to Table II, it will be noted that whereas $Ga+3$ at 0.65 A. is undersize to $Zn+2$ at 0.83 A., $In+3$ is oversize at 0.95 A. The conductivity picture would indicate that an activating mixture comprising indium and gallium would be very effective in increasing the conductivity of zinc oxide inasmuch as the undesirable effects due to the oversize of the $In+3$ ion and the undersize of the $Ga+3$ ion would compensate. As a primitive picture, the ZnO lattice might be considered a packing of equal spheres. Into this packing, occasional larger spheres of $In+3$ ions are introduced, producing bulges which stress the lattice. Then the introduction of smaller spheres of $Ga+3$ ions into the lattice removes the stresses and restores the whole lattice to a stable state.

In accordance with the foregoing theoretical considerations indicating that the trivalent activator atoms enter zinc sites in the lattice with a valence of $+2$, it would appear that the resulting compound constituting the coating is a complex oxide of zinc and activators in non-stoichiometric proportions. For instance, in the case of zinc oxide activated with indium, the resulting compound may be represented by the formula:

$$[Zn_xIn_yO_1]_n$$

wherein:

$x+y=1$
$x \gg y$
$n=$ an integer

In the case of zinc oxide activated with indium and gallium, the compound may be represented by the formula:

$$[Zn_xIn_yGa_zO_1]_n$$

wherein:

$x+y+z=1$
$x \gg y$ or $z$
$y$ and $z$ are approximately of the same order of magnitude
$n=$ an integer Whereas the foregoing theoretical considerations and formulae are believed to be accurate, it is to be clearly understood that they are presented in order to more fully explain the invention and to facilitate comprehension thereof, and that the invention is not to be considered dependent upon their validity. Obviously, the new and unexpected advantages of reduction in resistance of a zinc oxide coating achieved through activation with trivalent elements such as indium and gallium are established facts independently of the theoretical considerations proposed in explanation thereof.

To test the soundness of the above picturization, I have prepared an iridized ZnO coating on glass to which an activating mixture consisting of 3 moles of indium and 2 moles of gallium was added, these proportions providing an average ionic radius just equal to that of zinc. The indium and gallium were added as nitrates to the zinc in the acetate form, and the solution sprayed onto a glass panel at a temperature of 620° C. The highest conductivity was obtained with a solution in which the atomic percentage of gallium plus indium was 8% of the zinc. After annealing for three hours at a temperature of 250° C., the ZnO (In+Ga) coating showed a resistance of 2,750 ohms per square.

It will be noted in Table II that scandium in the trivalent ionic state (Sc+3) has an effective radius of 0.83 A. This is identical to the ionic radius of Zn+2 and thus the fit is theoretically perfect and scandium would appear the ideal activator for ZnO. Unfortunately this element is rare and expensive and does not afford a practical solution from an economic point of view.

It will also be noted yttrium and thallium (Y+3 and Tl+3) have ionic radii the same size as indium, thus indicating that these elements would be effective generally to the same degree as indium; however, they offer no particular advantages over it and have the disadvantages that yttrium is rare and expensive and thallium is very poisonous. It will also be noted that nickel, cobalt, iron, and chromium, all have ionic radii less than that of Zn+2, indicating that they can be used as secondary activators with indium in the fashion of gallium. It is to be expected however that these elements provide colored films in accordance with their properties well known in the art, and could be used where coloration is desirable.

One of the characteristics of a zinc oxide film is that it is relatively easily attacked by acids. For instance even dilute solutions of hydrochloric, nitric, sulphuric, or even acetic acids will convert the zinc to the corresponding salt and dissolve the film. It will be appreciated that whereas this characteristic may be a disadvantage where permanency and corrosion resistance is the prime requisite, it may also be an advantage depending upon the application in mind. For instance, in the case of electroluminescent panels such as luminous dial plates for clocks or instruments and meters, it may be desirable to form patterns or figures on the plate. With a zinc oxide film, such characters can readily be formed by masking the plate and washing the exposed areas with a dilute acid solution to form the nonconductive characters desired.

Another highly useful characteristic of zinc oxide films and which is closely associated with their use in electroluminescent panels is the fact that the conductivity of a zinc oxide film obviously cannot be poisoned by traces of zinc. Since zinc sulphide is one of the constituents generally included in electroluminescent phosphors, it will readily be appreciated that poisoning of the conductive film by traces of zinc could present a serious problem. The use of a conductive zinc oxide film for the transparent conducting plate in an electroluminescent cell thus obviates this difficulty.

It is to be understood that the specific activators for zinc oxide coatings which have been described above are intended to illustrate the invention which is not to be considered limited thereto. The invention proper is intended to be defined by the following claims.

What I claim as new and desire to secure by Letters Patent of the United States is:

1. An electric resistance device comprising a vitreous high temperature resistant substrate and an electrically conducting iridized coating thereon comprising primarily zinc oxide and including a trivalent element as activator, said element having an ionic radius approximating that of the divalent zinc ion and being of a nature such as to allow coexistence with divalent zinc ions in a zinc oxide lattice.

2. An electric resistance device comprising a vitreous high temperature resistant substrate and an electrically conducting iridized coating thereon comprising primarily zinc oxide and including indium as an activator.

3. An electric resistance device comprising a vitreous high temperature resistant substrate and an electrically conducting iridized coating thereon comprising primarily zinc oxide and including indium and gallium as activators.

4. A device as in claim 3 wherein the indium and gallium are in an atomic ratio of approximately 3 to 2.

5. An electric resistance device comprising a vitreous nonconductive body having an electrically conducting iridized coating on a surface thereof comprising primarily zinc oxide and including indium as an activator in an atomic ratio relative to zinc less than 20%.

6. An electric resistance device comprising a vitreous nonconductive body having an electrically conducting iridized coating on a surface thereof comprising primarily zinc oxide and including as activating elements indium and gallium in an atomic ratio one to the other of approximately 3 to 2 and in a total atomic ratio relative to zinc greater than 2% and less than 20%.

7. An electric resistance device comprising a high temperature resistant substrate of the class consisting of vitreous and ceramic materials, and an electrically conducting iridized coating thereon comprising primarily zinc oxide and including a trivalent element as activator, said element having an ionic radius approximating that of the divalent zinc ion and being of a nature such as to allow coexistence with divalent zinc ions in a zinc oxide lattice.

8. A device as in claim 7 wherein said element is present in an atomic ratio relative to zinc greater than 2% and less than 20%.

9. A device as in claim 7 wherein said element is present in an atomic ratio relative to zinc greater than 2% and less than 20% and wherein said element and zinc form a complex oxide.

10. An electric resistance device comprising a vitreous nonconductive body having an electrically conducting iridized coating on a surface thereof comprising primarily zinc oxide and including indium as an activator in an atomic ratio relative to zinc greater than 2% and less than 20%, said zinc and indium being in the form of a complex oxide.

References Cited in the file of this patent

UNITED STATES PATENTS

| 2,564,706 | Mochel | Aug. 21, 1951 |

FOREIGN PATENTS

| 458,118 | Canada | July 12, 1949 |